United States Patent
Anjum

(10) Patent No.: US 8,009,626 B2
(45) Date of Patent: Aug. 30, 2011

(54) DYNAMIC TEMPORARY MAC ADDRESS GENERATION IN WIRELESS NETWORKS

(75) Inventor: Farooq M. Anjum, Somerset, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 1374 days.

(21) Appl. No.: 11/160,813

(22) Filed: Jul. 11, 2005

(65) Prior Publication Data

US 2007/0019609 A1    Jan. 25, 2007

(51) Int. Cl.
    *H04W 4/00* (2009.01)
(52) U.S. Cl. ........ 370/331; 370/329; 370/328; 370/338; 455/415; 455/436; 455/442
(58) Field of Classification Search .......... 370/315–465; 455/436, 442, 432, 435.1, 415
See application file for complete search history.

(56) References Cited

U.S. PATENT DOCUMENTS

| | | | | |
|---|---|---|---|---|
| 6,091,717 | A * | 7/2000 | Honkasalo et al. | 370/329 |
| 7,342,896 | B2 * | 3/2008 | Ayyagari | 370/254 |
| 7,356,339 | B2 * | 4/2008 | Nam | 455/436 |
| 7,437,405 | B1 * | 10/2008 | Theis et al. | 709/203 |
| 2005/0036471 | A1 | 2/2005 | Singh | |
| 2005/0147060 | A1 | 7/2005 | Buckley | |
| 2005/0180403 | A1 * | 8/2005 | Haddad et al. | 370/352 |
| 2005/0276237 | A1 | 12/2005 | Segal | |
| 2006/0029027 | A1 | 2/2006 | Buckley | |
| 2006/0120317 | A1 * | 6/2006 | Zheng | 370/315 |
| 2006/0141981 | A1 * | 6/2006 | Lin | 455/403 |
| 2006/0285519 | A1 * | 12/2006 | Narayanan et al. | 370/331 |

OTHER PUBLICATIONS

3GPP TS 23.003 v5.9.0, http://www.3gpp.org/ftp/tsg_cn/TSG_CN/TSGN_26/Docs/PDF/NP-040527.pdf, Dec. 2004, p. 4-7, Greece.
3GPP TSG CN Plenary Meeting #26, Athens, Greece, NP-040527, pp. 1-7, Dec. 8-10, 2004.
International Preliminary Report, Mar. 5, 2009, pp. 1-5.
Canadian Office Action dated Jun. 10, 2011, issued in corresponding Canadian patent application No. 2,661,050.

* cited by examiner

*Primary Examiner* — Nghi H Ly
(74) *Attorney, Agent, or Firm* — Westerman, Hattori, Daniels & Adrian, LLP

(57) ABSTRACT

Unique temporary MAC addresses are calculated by mobile devices connected to wireless networks, using access point advertising information in combination with the permanent MAC address of the mobile device. The mobile devices use a hash function to construct a bit sequence from which a temporary MAC address can be extracted. The MAC address is unique over the entire region in which the mobile device can operate, without necessity of any coordination or negotiation between various access points of the region.

26 Claims, 3 Drawing Sheets

```
┌─────────────────────────────────────┐
│ 301 │ Mobile station transfers permanent
│     │ MAC address securely to the AP
└─────────────────────────────────────┘
                  │
                  ▼
┌─────────────────────────────────────┐
│ 302 │ Authentication and association of
│     │ mobile station with the AP using
│     │ permanent MAC address
└─────────────────────────────────────┘
                  │
                  ▼
┌─────────────────────────────────────┐
│ 303 │ Mobile station uses calculated
│     │ temporary MAC address to
│     │ communicate with AP, which verifies
│     │ transmitted MAC address against
│     │ received permanent MAC address
└─────────────────────────────────────┘
```

FIG. 3

DYNAMIC TEMPORARY MAC ADDRESS GENERATION IN WIRELESS NETWORKS

BACKGROUND

1. Field of the Invention

The present application relates generally to wireless networking, and more particularly to improving the privacy and security levels of a user's interactions with the network.

2. General Background Discussion

Internet Protocol

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer. The layers of the OSI model are listed below.

Layer 7 (i.e., the application layer) is a layer at which, e.g., communication partners are identified, quality of service is identified, user authentication and privacy are considered, constraints on data syntax are identified, etc.

Layer 6 (i.e., the presentation layer) is a layer that, e.g., converts incoming and outgoing data from one presentation format to another, etc.

Layer 5 (i.e., the session layer) is a layer that, e.g., sets up, coordinates, and terminates conversations, exchanges and dialogs between the applications, etc.

Layer-4 (i.e., the transport layer) is a layer that, e.g., manages end-to-end control and error-checking, etc.

Layer-3 (i.e., the network layer) is a layer that, e.g., handles routing and forwarding, etc.

Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery.

Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

Typically, layers higher than layer-2 (such as, e.g., layers including the network layer or layer-3 in the OSI model and the like) are referred to as the higher-layers.

Wireless Networks

Wireless networks can incorporate a variety of types of mobile devices, such as cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data.

Wireless LANs (WLANs) in which a mobile user can connect to a local area network (LAN) through a wireless connection may be employed for wireless communications. Wireless communications can include communications that propagate via electromagnetic waves, such as light, infrared, radio, microwave. There are a variety of WLAN standards that currently exist, such as, e.g., Bluetooth, IEEE 802.11, and HomeRF.

IEEE 802.11 specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

Wireless networks can also involve methods and protocols found in Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address by using a protocol such as Internet Control Message Protocol (ICMP).

In basic IP routing, routing mechanisms typically rely on the assumptions that each network node always has a constant attachment point to the Internet and that each node's IP address identifies the network link it is attached to. In this document, the terminology "node" includes a connection point, which can include a redistribution point or an end point for data transmissions, and which can recognize, process and/or forward communications to other nodes. For example, Internet routers can look at an IP address prefix or the like identifying a device's network. Then, at a network level, routers can look at a set of bits identifying a particular subnet. Then, at a subnet level, routers can look at a set of bits identifying a particular device. With typical mobile IP communications, if a user disconnects a mobile device from the Internet and tries to reconnect it at a new subnet, then the device has to be reconfigured with a new IP address, a proper netmask and a default router. Otherwise, routing protocols would not be able to deliver the packets properly.

MAC Addresses and Privacy

The Media Access Control (MAC) address serves as a unique identifier of a network device. A MAC address is assigned to a network device at the manufacturing stage (typically after having undergone a quality control inspection) by burning or writing it into a permanent location in the network device, such as in ROM. Because of the need to provide a unique MAC address for each network device, MAC address assignment has to be centrally controlled. Consequently the association of MAC addresses with purchasers or users of the network devices is possible, with the result that an observer is able to trace the movements of users based on the MAC address. This also will enable the collection of user history and profile data by an observer. This is possible even when layer 2 security is being used to encrypt the layer 2 packets.

To prevent compromising of user privacy and security, the concept of temporary device identifiers has been proposed in other areas such as 3G networks. In the case of 3G networks, the procedure to use temporary device identifiers is as follows. Every 3G device has a permanent identifier analogous to the permanent MAC address for WLAN devices. When the 3G device desires to connect to a base station, it first sends its permanent identifier "in the clear" (i.e. unencrypted) to the base station. The base station in reply sends to the 3G device (also in the clear) a temporary identifier that the 3G device can then start using. Because the base station allocates the temporary addresses, it can ensure that a single address is not allocated to multiple devices simultaneously.

A problem in 3G networks is the initial usage of the permanent identifier "in the clear," i.e. in an unencrypted manner such that the permanent identifier may be observed by third parties. The 3G system allocates the temporary identifier only after the initial insecure transmission of the permanent identifier. Thus, anybody "listening to" or monitoring communications on the wireless channel continuously would be able to link the temporary address to the permanent address and from there draw inferences about the communication pattern of a device.

In an attempt to avoid this, 3G networks include the concept of a temporary address called TMSI, or Temporary Mobile Subscriber Identity. TMSI has only local significance (e.g., within a VLR (Visitor Location Register) and the area controlled by a VLR, or within an SGSN (Serving General Packet Radio Service Support Node) and the area controlled by an SGSN). As a result, the structure and coding of the TMSI can be defined by agreement between the network operator and manufacturer to meet local needs. This implies the presence of protocols in the 3G network to ensure the uniqueness of the TMSI.

In the case of WLANs, in contrast, it must be ensured that any temporary identifier is unique within a given region that can correspond either to a single Access Point (AP), to multiple APs with the same ESSID (Extended Service Set Identifier), or to multiple APs with different ESSIDs, but which belong to the same organization and are hence accessed via a single router.

The 3G network solution does not provide an efficient solution to the problem in WLANs. With the 3G approach, a mobile device would have to contact the Access Point, which would then allocate a temporary MAC address to the mobile device. This temporary MAC address would have to be unique across the entire region within which the mobile device would be operational. As discussed above, this region could span a single AP, multiple APs with the same ESSID or multiple APs with different ESSIDs.

It would not be difficult to ensure the uniqueness of a temporary MAC address across a region that spans a single AP, as the single AP itself can ensure this during allocation. However, when the mobile device moves from that region to an area covered by a different Access Point, then ensuring that the temporary MAC address is unique would require coordination and negotiation between the involved Access Points (i.e., the old AP and the new AP).

In view of the foregoing, a more efficient solution is needed in the WLAN art, which would be able to allocate a temporary MAC address to a mobile device such that the temporary MAC address would be unique across the region, and which does not require cumbersome and costly coordination and negotiation among Access Points. In addition, the temporary MAC address should provide user anonymity in all cases irrespective of whether the WLAN channel is being monitored or eavesdropped upon.

SUMMARY OF THE PREFERRED EMBODIMENTS

The preferred embodiments of the present invention can significantly improve upon the prior art and provide a solution to the problem of efficient temporary MAC address allocation to mobile devices in WLANs.

According to one aspect of the invention, a method is provided of creating a temporary identifier that is used to identify a mobile device on a wireless network. The method can include the steps of receiving information from a network access point to which the mobile device connects to said wireless network; combining the received information with a permanent identifier assigned to the mobile device; performing a predetermined mathematical calculation on the combination of the received information and permanent identifier; and using the result of the calculation to provide a temporary identifier of the mobile device in communications over the wireless network that satisfies the above constraints.

According to another aspect of the invention, a mobile device is provided, which can calculate its own unique temporary MAC address for use in a wireless network and which does not require any coordination or negotiation between access points on the network.

According to yet another aspect of the invention, a wireless network is provided wherein access points broadcast advertising information that is used by mobile devices seeking to connect to the wireless network to calculate unique temporary MAC addressed.

BRIEF DESCRIPTION OF THE DRAWINGS

The preferred embodiments of the present invention are shown by a way of example, and not limitation, in the accompanying figures, in which:

FIG. 3 is a flow diagram of a second procedure for establishing a temporary MAC address according to another embodiment of the present invention.

DETAILED DESCRIPTION OF THE PREFERRED EMBODIMENTS

While the present invention may be embodied in many different forms, the illustrative embodiments are described herein with the understanding that the present disclosure is to be considered as providing examples of the principles of the invention and that such examples are not intended to limit the invention to preferred embodiments described herein and/or illustrated herein.

According to the preferred embodiments of the invention, a mobile device is able to self-allocate a temporary MAC address that is ensured to be unique in the entire region over which the mobile device may traverse. The concepts of the invention may be categorized into two phases: the first phase addresses the uniqueness of the temporary MAC address, and the second phase ensures both that only authorized devices can communicate via the Access Point, and that an intruder cannot trace the amount of communication in which a particular device participates.

Phase 1

Figure 1:
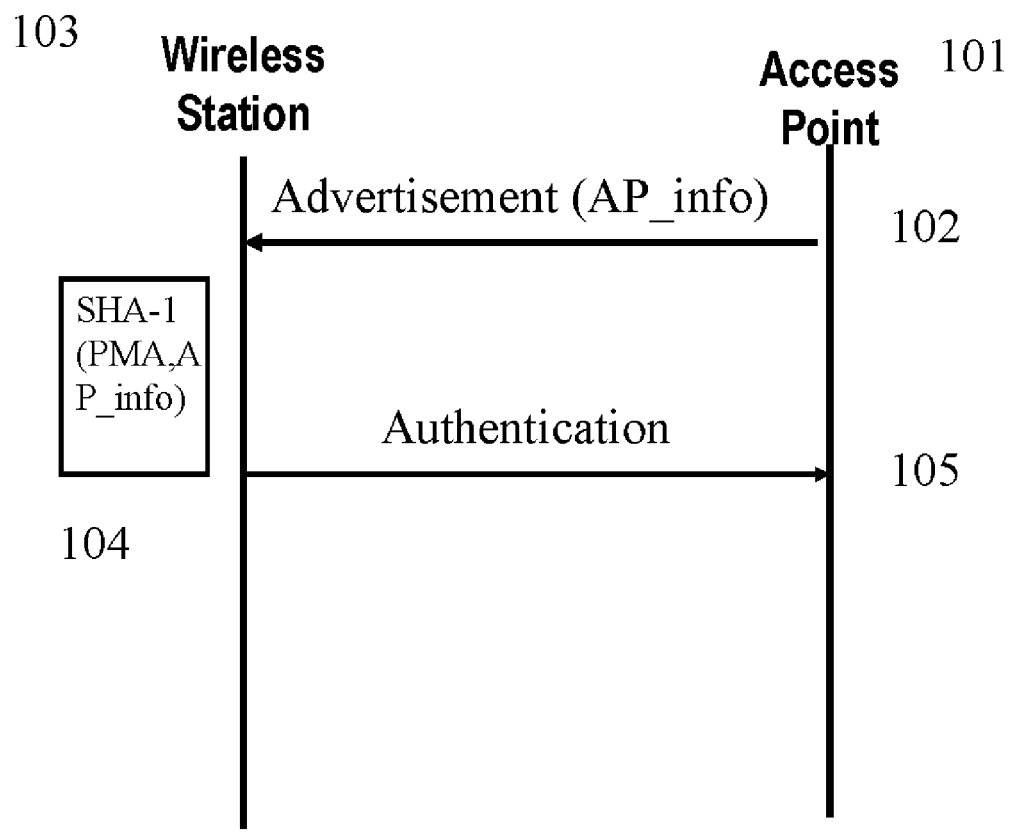
FIG. 1 is a diagram of an access point and wireless mobile station interaction for generation of a temporary MAC address and mobile station authentication and association with the wireless network, in accordance with an embodiment of the present invention.

In this phase, with reference to FIG. 1, it is assumed that the Access Point 101 "advertises" or broadcasts to the region for which it is responsible information 102 that identifies that region. This information 102 could be as simple as just the SSID of the AP or could include other information such as the SSID, the network ID etc. Additionally, it is possible for more than one Access Point to exist in a particular region, as in public areas such as airports, parks, public buildings, etc., wherein each Access Point would represent a different WLAN of a different service provider. In accordance with the invention, the mobile station 103 receives the information from the Access Point to which it desires to connect, and then hashes its own permanent MAC address (PMA as indicated in FIG. 1) with the received advertised information, using an algorithm 104. This will provide a unique temporary MAC address for the mobile station across the entire region served by the AP. When the mobile station moves into a region served by a different AP (which the mobile station will detect from received AP beacons or from replies to mobile station-sent probe signals), it will again perform the hash function calculation related to the temporary MAC address, with the new advertised information received from the new AP. The advertised information that is considered in the hashing algorithm can be driven by policy and can be different for different regions or it can be the same for many regions such as the case would be when using the SSID. In the latter case, the same temporary MAC address would be valid over all the regions that have the same advertised information. Indication of this information to the mobile station can be provided by using an appropriate out-of-band communication, such as over a control channel, etc. The mobile station uses the calculated temporary MAC address to complete the authentication process 105 in order to connect to the wireless network to be able to send and to receive information.

Figure 2:
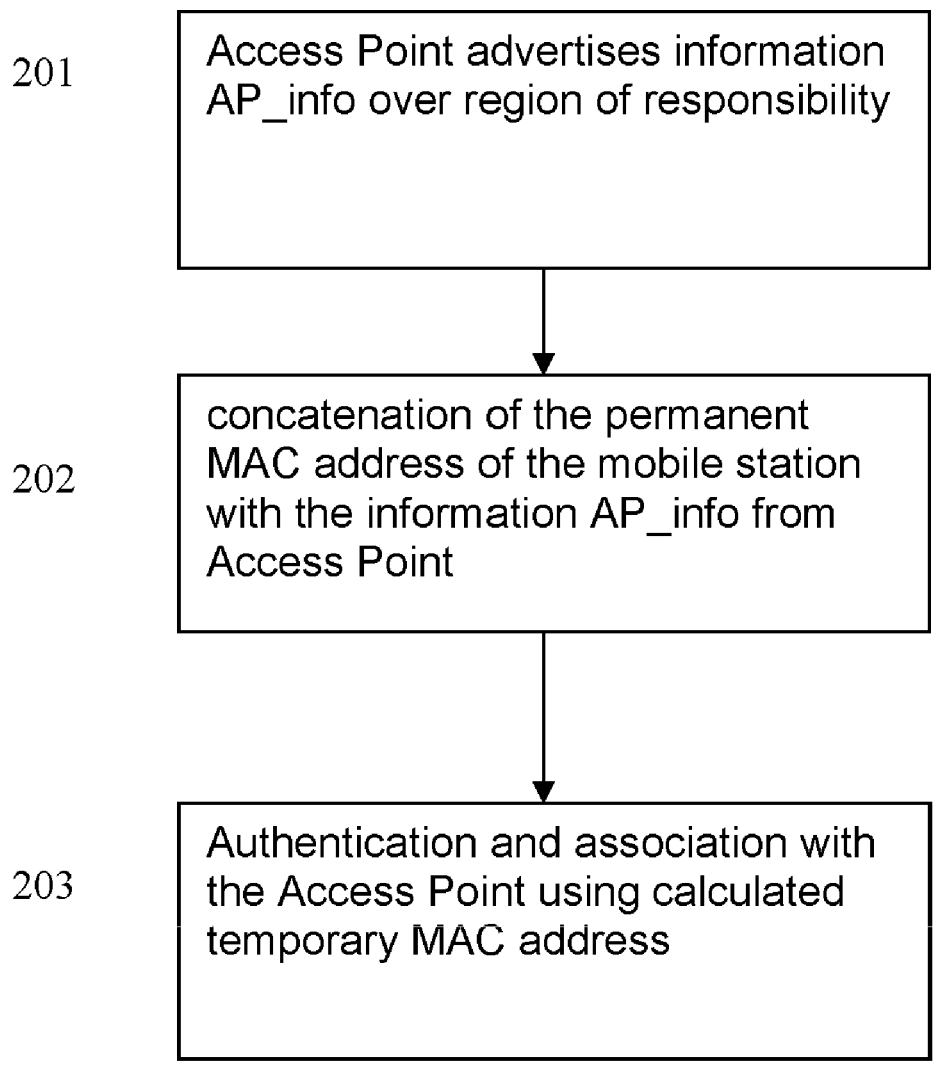
FIG. 2 is a flow diagram of a first procedure for establishing a temporary MAC address according to one embodiment of the present invention.

Referring now to FIG. 2, in step 201 the Access Point advertises information that is pertinent to the region in which the mobile station is presently located. The advertised information can include, for example, information related to SSID, access router identifier, costs, capabilities of the Access Point, etc. The advertisement can be communicated to the mobile device either via beacons from the AP or via responses by the AP to probes transmitted by the mobile device, or any other suitable method. In accordance with the invention, some or all of this advertised information is then used to determine a temporary MAC address for the mobile device. The particular advertised information to be used by the mobile device can be determined by policy, and itself can be indicated in the advertisement.

Next, at step 202 the mobile station on receiving this information will construct a string which is a concatenation of the permanent MAC address of the mobile station with the information from the advertisement that is to be included in the calculation. This string is then hashed using any standard hashing algorithm such as SHA-1, MD5, etc. SHA-1 is shown in FIG. 1 for purposes of illustration. The 48 bits of the resultant output of the hash function then will be used as the temporary MAC address.

The mobile station at step 203 then proceeds with the rest of the network connection process, which involves authenticating and then associating with the Access Point using technologies such as 802.11i protocols, with the calculated temporary MAC address instead of the permanent MAC address that was burned into the device in the manufacturing stage.

Phase 2

Phase 2 is an optional alternate embodiment and would be used if it is also desired to prevent traffic analysis in addition to anonymity.

Phase 2 ensures that only authorized devices can communicate via the access point, and also that an intruder cannot trace the amount of communication in which a particular device participates. Here, it is noted that phase 1 and phase 2 need not be contiguous in terms of the message exchange. Each of these phases is also independent of each other.

At the beginning of phase 2, as shown at step 301 in FIG. 3, it is assumed that the permanent MAC address has been transferred securely to the AP. (This could be done using the flow of phase 1 for example) Further, the mobile device has also successfully authenticated itself with the AP (via the Access, Authentication and Accounting (AAA) server) and the corresponding keying material has been derived from the PMK key (step 302).

At this point both the mobile station and the AP have the following information:

permanent MAC address of the mobile station (this could have been transferred openly if phase 1 was not used (although this is not recommended) or it could have been transferred as an encrypted message after successful authentication);

AP_info which is the information that is unique to the region of interest. This can be the same as the information used in phase 1;

PMK, which has been derived as a result of successful authentication.

At step 303, the mobile device is expected to use as the MAC address the value:

HMAC(permanent MAC address, AP_info, COUNTER)

where the COUNTER is increased by one for each cycle. In a given cycle the HMAC value is the calculated 160 bit hash value. 48 bits of this 160 bit value to serve as the temporary MAC address (step 303). The exact 48 bits used as the temporary MAC address could be based on a deterministic algorithm. The deterministic algorithm can be as simple as always using the first 48 bits of the HMAC as the temporary MAC address, to being as complex as being a cyclic usage of the 160 bits of the hash value. The AP can check the transmitted temporary MAC address to verify it according to such rules. If the transmitted MAC address does not match, then the packet is dropped. Note that as a result of this procedure the MAC address can change not only from cycle to cycle but can also change during a cycle. This makes it very difficult to trace the communication pattern of a given mobile device. This implicitly assumes that there are multiple connected devices in the area concerned.

Implementation Example

Considering a region spanning multiple APs, let the unique identifier information consist of the SSID, which will be denoted as A, and the IP address of the access router, denoted as B. Consider a mobile station with a permanent MAC address C. Then the temporary MAC address of the mobile station for use in this region is given by h(A,B,C) where h() denotes a hash function. Any standard hash function such as SHA, MD5, etc. can be used for this purpose. Assuming that a MAC address occupies k bits, we consider only the first k bits of the hash function. Note that typically k is 48 bits in length.

As the mobile station traverses the region and is handed off from one AP to another, it receives the SSID and IP address of the new access router, and performs again the calculation h(A,B,C) for the new AP. The mobile station then uses the calculation result as its new temporary MAC address.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example."

What is claimed is:

1. A method of creating a temporary identifier that is used to identify a mobile device on a wireless network, comprising the steps of:
   receiving information from a network access point to which said mobile device connects to said wireless network;
   combining said received information with a permanent identifier assigned to said mobile device;
   performing a predetermined mathematical calculation on the combination of said received information and permanent identifier; and
   using the result of said calculation to provide a temporary identifier of said mobile device in communications over said wireless network.

2. The method of claim 1, wherein said permanent identifier is a Media Access Control (MAC) address, and said temporary identifier is a temporary MAC address.

3. The method of claim 1, wherein said predetermined calculation is a hash function algorithm.

4. The method of claim 1, wherein the step of using the calculation result comprises the step of extracting a predetermined number of bits from said calculation result.

5. The method of claim 1, wherein the step of performing is carried out once per communication cycle of said wireless network such that a new temporary identifier is used in each communication cycle of said mobile device.

6. The method of claim 1, wherein the step of performing is carried out once per network connection session of said mobile device such that a new temporary identifier is used in each network session of said mobile device.

7. The method of claim 1, further comprising the step of communicating said permanent identifier to said access point.

8. The method of claim 7, wherein said permanent identifier is used by said access point to verify said temporary identifier as transmitted by said mobile device.

9. The method of claim 1, wherein the information received from the network access point includes information indicating specific pieces of information to be used by said mobile device to calculate said temporary identifier.

10. The method of claim 1, wherein said mobile device calculates a new temporary identifier upon being transferred from one access point to a new access point.

11. The method of claim 1, wherein said temporary ID is used between said mobile device and said wireless network and not between said mobile device and another mobile device or party.

12. In a mobile device that is connectable for communication over a wireless network, the improvement wherein said mobile device uses information received from a network access point to calculate a temporary identifier based in part on said information, wherein said temporary identifier is used to identify said mobile device on said network, and wherein said temporary identifier is a temporary Media Access Control (MAC) address whereby said mobile device receives a unique temporary MAC address for the particular region served by said network access point, further including:
   said mobile device being configured to receive information from the network access point to which said mobile device connects to the wireless network;
   said mobile device being configured to combine said received information with a permanent identifier assigned to said mobile device;
   said mobile device being configured to perform a predetermined mathematical calculation on the combination of said received information and permanent identifier; and
   said mobile device being configured to use the result of said calculation to provide a temporary identifier of said mobile device in communications over the wireless network.

13. In a mobile device as set forth in claim 12, wherein said wireless network is a wireless local area network (WLAN) and wherein said temporary Media Access Control address is used across a region having multiple Access Points.

14. In a mobile device as set forth in claim 13, wherein said mobile device further uses a permanent Media Access Control (MAC) address in said calculation.

15. In a mobile device as set forth in claim 12, wherein said mobile device uses a hash function algorithm in said calculation.

16. In a mobile device as set forth in claim 12, wherein said mobile device uses information from said access point specifying the information to be used in said calculation.

17. The method of claim 12, wherein the mobile device receives broadcasts from a first network access point to a first region of information that identifies that first region, and the mobile device receives that first-region information and calculates its own first temporary MAC address for that first region, and wherein the mobile devices moves to a second region of a second network access point and receives broadcasts from the second network access point to the second region with information identifying that second region, and the mobile device receives that second-region information and creates its own second temporary MAC address for use in that second region.

18. A wireless network, comprising:

a plurality of network access points, each network access point transmitting advertising information in a region covered by that access point, said advertising information including information specifying a parameter for calculation by a mobile device connectable to said network of a temporary identifier to be used by said mobile device in communications over said network, and wherein said temporary identifier is a temporary Media Access Control (MAC) address, and further including:

at least one of said network access points being configured to transmit to the mobile device information from the network access point to which the mobile device connects to the wireless network, for use by the mobile device to combine said received information with a permanent identifier assigned to the mobile device and to perform a predetermined mathematical calculation on the combination of the received information and the permanent identifier; and said at least one of said network access points being configured to receive the permanent identifier assigned to the mobile device and to perform a predetermined mathematical calculation on the combination of the information to be used by the mobile device and the permanent identifier to verify an authenticity of a temporary identifier of said mobile device for communications over the wireless network.

19. The wireless network of claim 18, wherein said wireless network is a wireless local area network (WLAN) and wherein said temporary Media Access Control address is used across a region having multiple Access Points.

20. The wireless network of claim 18, wherein said parameter is a specific piece of advertising information to be used by said mobile device in said calculation.

21. The wireless network of claim 18, wherein said calculation comprises a hash function algorithm.

22. The wireless network of claim 18, wherein at least one of said network access points receives a permanent identifier of a mobile device connectable to said network.

23. The wireless network of claim 22, wherein said permanent identifier comprises a permanent Media Access Control (MAC) address of said mobile device and said temporary identifier is a temporary Media Access Control (MAC) address.

24. The wireless network of claim 23, wherein said at least one network access point uses said permanent Media Access Control (MAC) address to verify authenticity of said temporary Media Access Control (MAC) address.

25. The wireless network of claim 18, wherein when the mobile device is within a first region of a first of said network access points, said first network access point broadcasts information to a first region that identifies that first region, which first information is used by said the mobile device to calculate its own first temporary MAC address used for that first region, and wherein when the mobile device moves within a second region of a second of said network access points, said second network access point broadcasts second information to said second region that identifies that second region, which second information is used by said the mobile device to calculate its own second temporary MAC address for that second region.

26. The wireless network of claim 18, wherein said mobile device creates different unique temporary MAC addresses that are used by said mobile device across different regions served by different ones of said network access points.

* * * * *

UNITED STATES PATENT AND TRADEMARK OFFICE
CERTIFICATE OF CORRECTION

| | | |
|---|---|---|
| PATENT NO. | : 8,009,626 B2 | Page 1 of 1 |
| APPLICATION NO. | : 11/160813 | |
| DATED | : August 30, 2011 | |
| INVENTOR(S) | : Anjum | |

It is certified that error appears in the above-identified patent and that said Letters Patent is hereby corrected as shown below:

In the Claims

In Column 9, Line 4, in Claim 17, delete "The method of claim 12," and insert -- In a mobile device as set forth in claim 12, --, therefor.

In Column 10, Line 27, in Claim 25, delete "said the" and insert -- said --, therefor.

In Column 10, Line 33, in Claim 25, delete "said the" and insert -- said --, therefor.

Signed and Sealed this
Fourth Day of November, 2014

Michelle K. Lee
*Deputy Director of the United States Patent and Trademark Office*